(12) United States Patent
Lyras

(10) Patent No.: US 6,514,128 B1
(45) Date of Patent: Feb. 4, 2003

(54) APPARATUS FOR SEPARATING ABRASIVE BLASTING MEDIA FROM DEBRIS

(76) Inventor: Gus Lyras, 6800 List La., Lowellville, OH (US) 44436

(*) Notice: Subject to any disclaimer, the term of this patent is extended or adjusted under 35 U.S.C. 154(b) by 0 days.

(21) Appl. No.: 10/191,344

(22) Filed: Jul. 9, 2002

(51) Int. Cl.$^7$ .................................................. B24C 9/00
(52) U.S. Cl. ........................................... 451/88; 451/87
(58) Field of Search ............................. 451/87, 88, 38, 451/92

(56) References Cited

U.S. PATENT DOCUMENTS

| | | |
|---|---|---|
| 4,394,256 A | 7/1983 | Goff |
| 4,753,052 A * | 6/1988 | Dickson |
| 4,771,579 A | 9/1988 | Giese |
| 5,035,089 A | 7/1991 | Tillman et al. |
| 5,185,968 A | 2/1993 | Lyras |
| 5,195,640 A | 3/1993 | Seaverns |
| 5,231,806 A * | 8/1993 | Swain |
| 5,269,424 A | 12/1993 | Lyras |
| 5,695,385 A | 12/1997 | Bachand et al. |

* cited by examiner

Primary Examiner—Eileen P. Morgan
(74) Attorney, Agent, or Firm—Harpman & Harpman

(57) ABSTRACT

An apparatus for recovering and cleaning contaminated abrasive blast media. A transportation assembly supplies contaminated blast media to an in feed cylinder within a rotating drum separator. The drum separator is formed from a plurality of elongated spaced parallel-aligned elements that define gradation openings between adjacent elements. The blast media is transported within the drum along the gradation interior surface. An internal spiral vein on the inside of the drum surface moves the media progressively through the drums exposing it to different areas of the drum surface having different gradation configurations. An air wash separator receives filtered blast media from the drum for final separation processing and reuse.

14 Claims, 5 Drawing Sheets

US 6,514,128 B1

APPARATUS FOR SEPARATING ABRASIVE BLASTING MEDIA FROM DEBRIS

BACKGROUND OF THE INVENTION

1. Technical Field

This invention relates to devices for processing contaminated blast media for reuse. Such contaminants are comprised of dust, paint, rust which are entrained within the spent blast medium after use.

2. Description of Prior Art

Prior art devices of this type have used a variety of separation methods and apparatus, see for example U.S. Pat. Nos. 4,394,256, 4,771,579, 5,035,089, 5,195,640, 5,185,968, 5,269,424 and 5,695,37.

In U.S. Pat. No. 4,394,256 a separation apparatus is illustrated having a re-circulation chamber in which spent abrasives are recirculated at high velocity using the chamber's integral angled configuration to achieve primary separation.

U.S. Pat. No. 4,771,579 is directed to a cleaning and recovery device for abrasive blast media utilizing an internal air suspension in which media and contaminants of at least equal in weight drops out of the air suspension into a rotary filtered drum having a plurality of punch apertures within its surface to separate media and contaminants.

U.S. Pat. No. 5,035,089 claims a blast media recovery cleaning system having multiple separators. A fluidized bed is formed by use of a porous stone within a plenum. Compressed air is supplied to the stone so as to separate lower density materials from the higher density retaining the heavier materials within the plenum.

Applicant's own U.S. Pat. No. 5,185,968 is directed to a mobile separation system for abrasive blasting material using a multi-step separation and cleaning process in which a magnetic drum separator is used to process the contaminated blast media along with an integral air wash system.

U.S. Pat. No. 5,195,640 defines an abrasive blast media cleaning device using a rotating drum separator that uses high velocity air stream there through into which the contaminated blast material is repeatedly scooped up and dropped within.

Applicant's U.S. Pat. No. 5,269,424 claims a mobile apparatus for separation and recovery of spent abrasive blasting material utilizing magnetic drum separator in combination with an air wash dust collection and secondary wash for processing the blast media.

Finally, U.S. Pat. No. 3,695,385 discloses a recyclable abrasive blasting system and method utilizing multiple separation elements including a triple screening system.

SUMMARY OF THE INVENTION

A mobile apparatus for separation and recovery of abrasive blast material from entrained contaminants after use. A unique drum separator is used in combination with point intake and multiple outlet paths, one of which utilizes an air washer for final contaminant separation. The drum separator utilizes annular filtering slots of different sizes formed by independent spaced parallel annular angular inclined bands held together by radially spaced support rods. Abrasive blasts material is transported through the recovering drum separator by an integral continuous transportation vein affixed to its interior surface.

DESCRIPTION OF THE DRAWINGS

FIG. 3 is a partial sectional view of the filtering drum of the invention illustrating central in feed of contaminated material and multiple outlet of filtered material there from;

FIG. 7 is a graphic side elevational view of the filter drum of the invention and associated cleaning brushes and inlet and outflow of blast material there from.

DESCRIPTION OF THE PREFERRED EMBODIMENT

Figure 1:
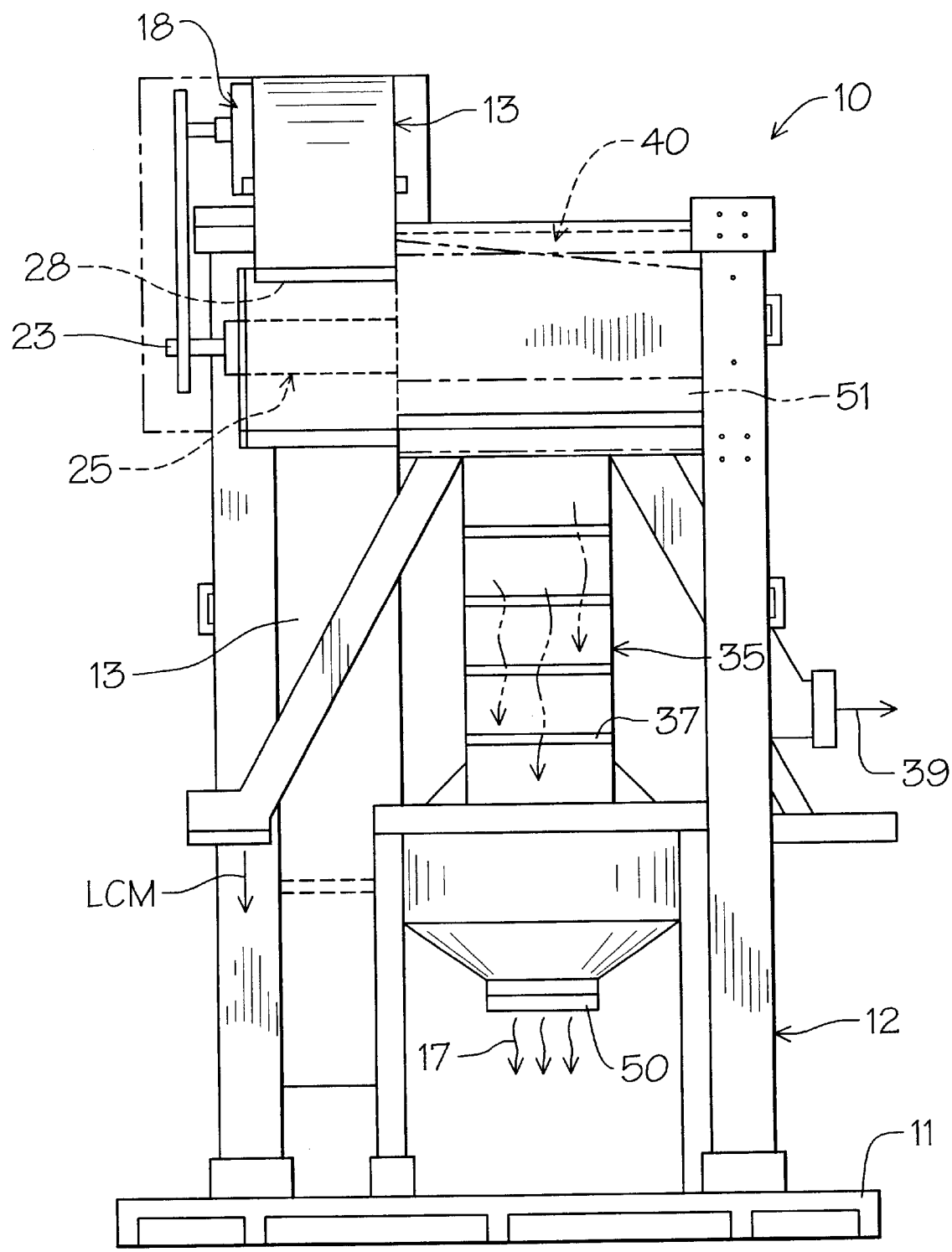
FIG. 1 is a front elevational view of the mobile separator.
Figure 2:
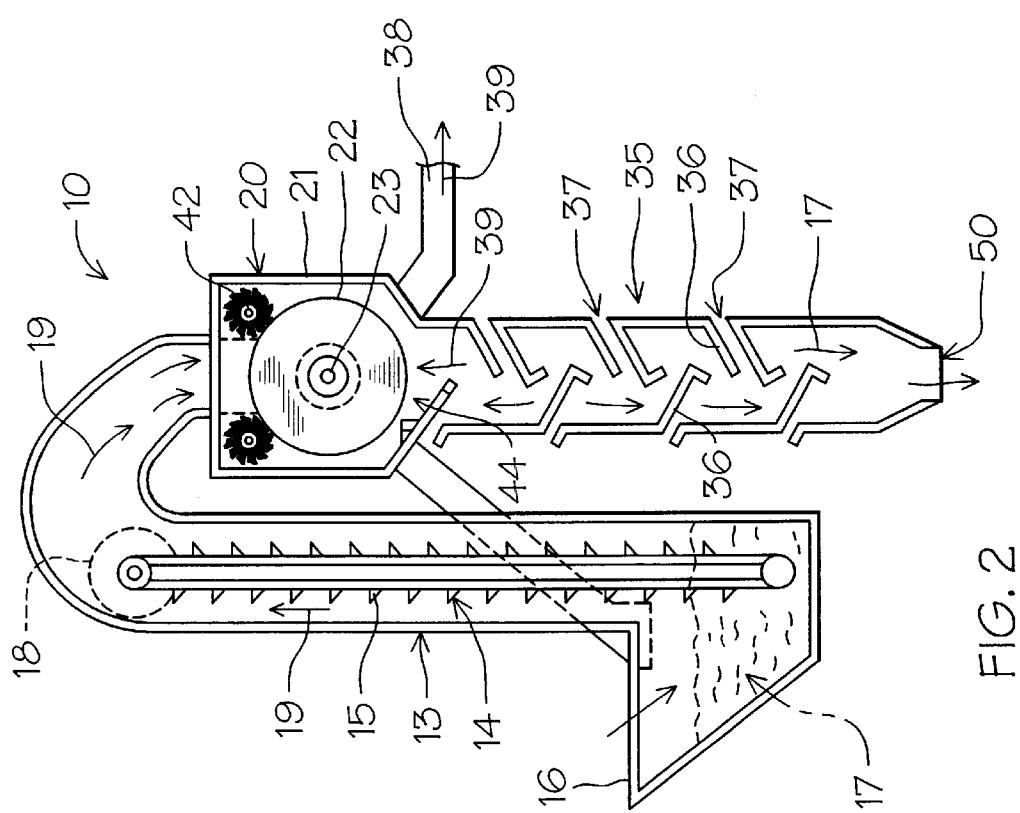
FIG. 2 is a graphic representation in cross section illustrating material in feed for the separation drum of the invention and associated air wash.

Referring now to FIGS. 1–4 of the drawings, an abrasive blast medium separator and recovery device 10 of the invention can be seen having an integral transportation base 11 with a support frame 12 extending there from. A bucket elevator 13 is positioned within the support frame 12 having an endless belt 14 with multiple material transportation buckets 15 extending there from as seen in FIG. 2 of the drawings. The bucket elevator 13 has an inlet hopper 16 into which contaminated abrasive blast media 17 is deposited. Such bucket elevators are commercially available and an example of same is manufactured by Universal Industries under Model U1220 having a free flowing material capacity of 220 CFH.

A drive motor assembly 18 drives the bucket elevator 13 as illustrated specifically in FIG. 1 of the drawings.

Referring now to FIG. 2 of the drawings, the material process flow path for contaminated abrasive blast material is illustrated by flow direction arrows 19. Contaminated abrasive blast media is delivered by the bucket elevator 13 as hereinbefore described to a primary mechanical material sized delineator sorter 20 of the invention. The sorter 20 comprises a central housing 21 having a filter drum 22 rotatably positioned within. The filter drum 22 has a central drive shaft 23 secured to an end drum closure panel 24. The central drive shaft 23 extends from a material feed cylinder 25 within the drum 22. The feed cylinder 25 has a screw flight 26 on the drive shaft 23 and is open at its end 27 within the confines of the filter drum 22. A material inlet opening at 28 is formed within the feed cylinder 25 inwardly from its end in oppositely disposed relation to the open end 27. The elevator bucket 13 deposits contaminated abrasive blasts media 17 into the feed cylinder 25 by which the screw flight 26 moves the contaminated abrasive blast media through and out the open end 27 of the feed cylinder 25 as illustrated by directional arrows 28 directly into the adjacent end area of the filter drum 22 for processing.

Figure 4:
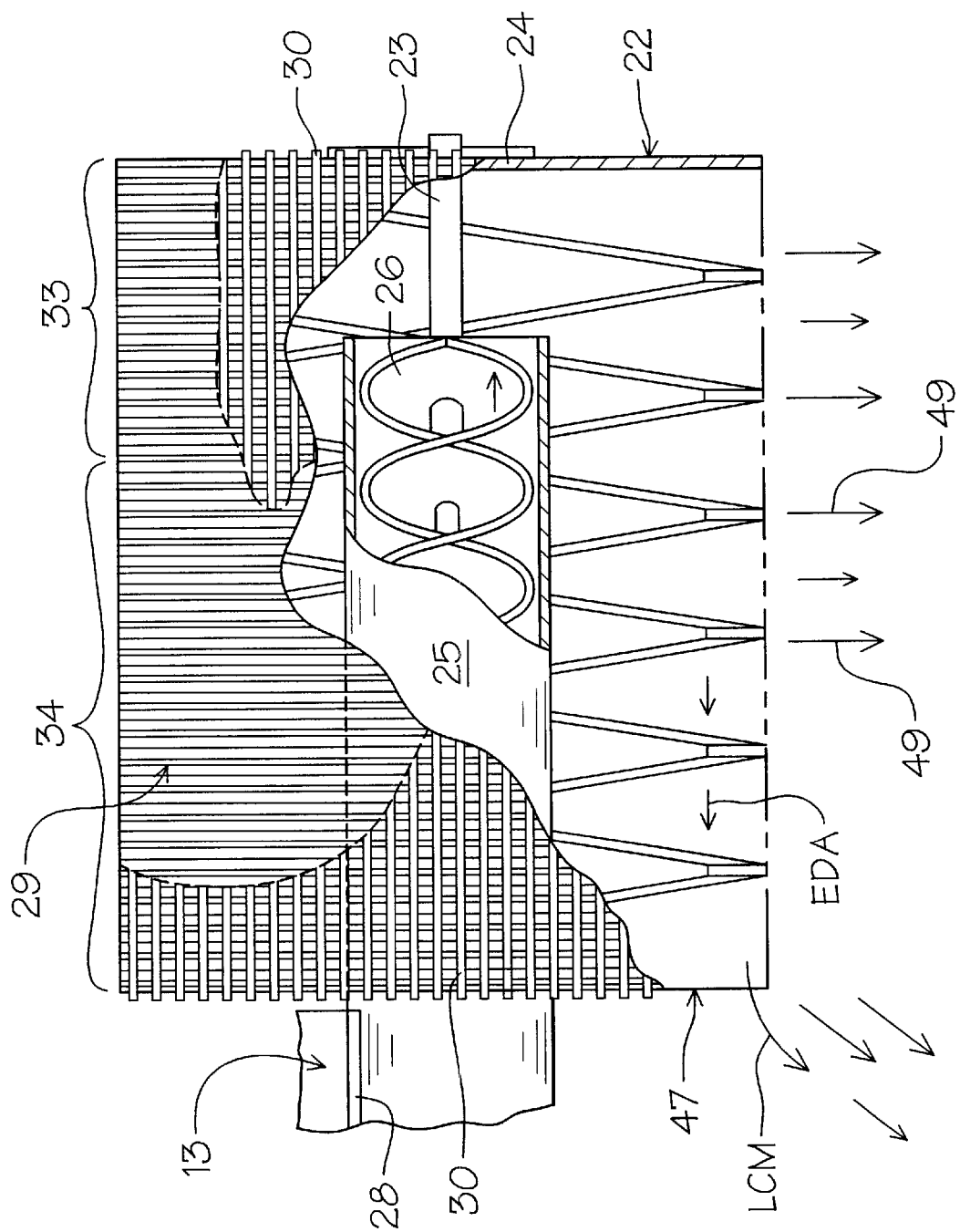
FIG. 4 is an enlarged partial cross-sectional view of the filter drum of the invention.
Figure 5:
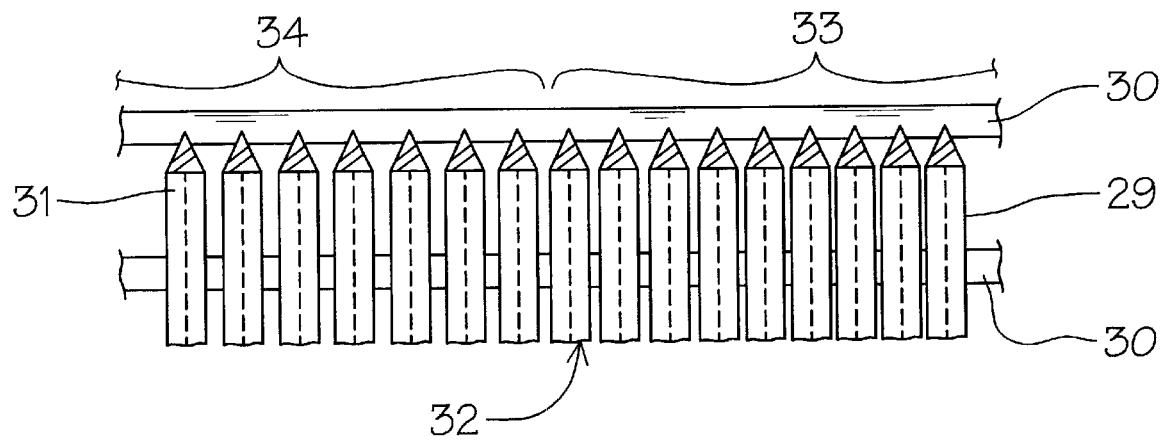
FIG. 5 is an enlarged partial cross-sectional view of the filter drum's construction.
Figure 6:
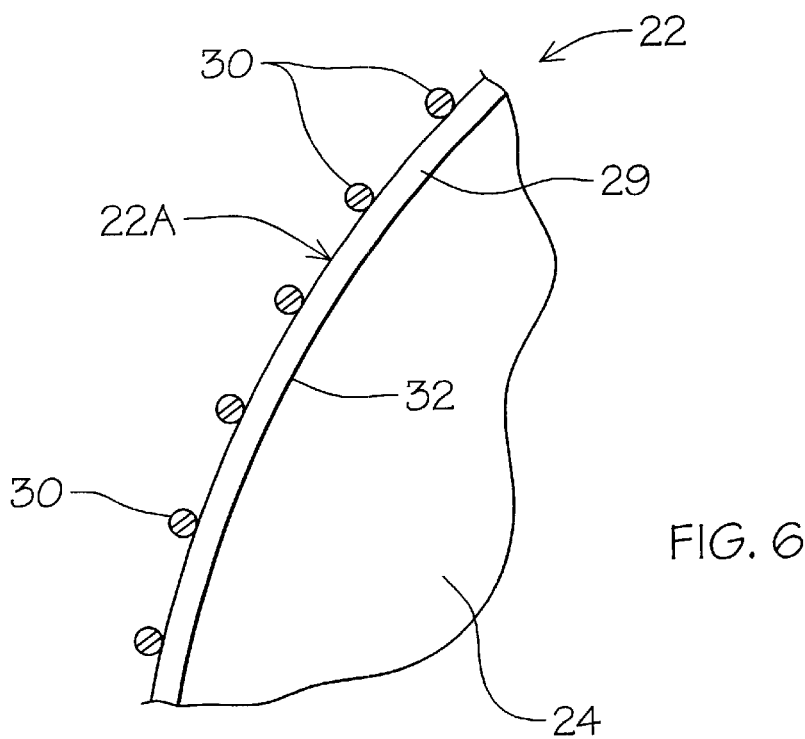
FIG. 6 is a graphic illustration of the multiple support elements of the filter drum.

The unique filter drum 22 of the invention is made from a plurality of annular cross-sectionally triangular rods 29 aligned in spaced parallel relation to one another. The rods 29 are held in parallel alignment by a plurality of support bars 30 that extend at right angles transversely there across as seen in FIGS. 57 of the drawings. The support bars 30 themselves are radially spaced about an outer surface 22A of the filter drum 22. Each of the drum rods 29 are oriented with their respective "wide base" 31 of the triangle facing inwardly defining a contoured smooth interior surface 32 as best seen in FIG. 6 of the drawings. It will be apparent that the relative spacing between the adjacent rods 29 define the effective filter resolution i.e. grade or grid size of the filter drum 22. In this example, an initial material contact area 33 within the interior of the drum 22 is of a relatively "fine" filter surface which extends approximately one-third the overall length of the drum as seen in FIGS. 4 and 5 of the drawings. The remaining drum interior surface at 34 has the respective rods 29 and their associated bases 31 spaced further apart imparting a relatively "coarse" filter surface which will allow selectively larger material particle size to pass there through.

Referring now to FIGS. 1 and 2 of the drawings, the multiple stage air washer 35 can be seen positioned directly below the filter drum 22 to receive selected recyclable abrasive blast media there from. The multiple air washer 35 is well known within the art and is comprised of a vertical chamber having multiple deflection angularly positioned veins 36, each of which is positioned adjacent an outside air inlet 37 to affect a specific gravity air separation of the contaminated abrasive blast material as it cascades downwardly through the air washer. The entrained lighter weight contaminants correspondingly force upwardly through the return and removal passage 38 to be drawn off by an associated high pressure dust filter indicated by air flow path arrow 39 interconnected thereto.

Figure 3:
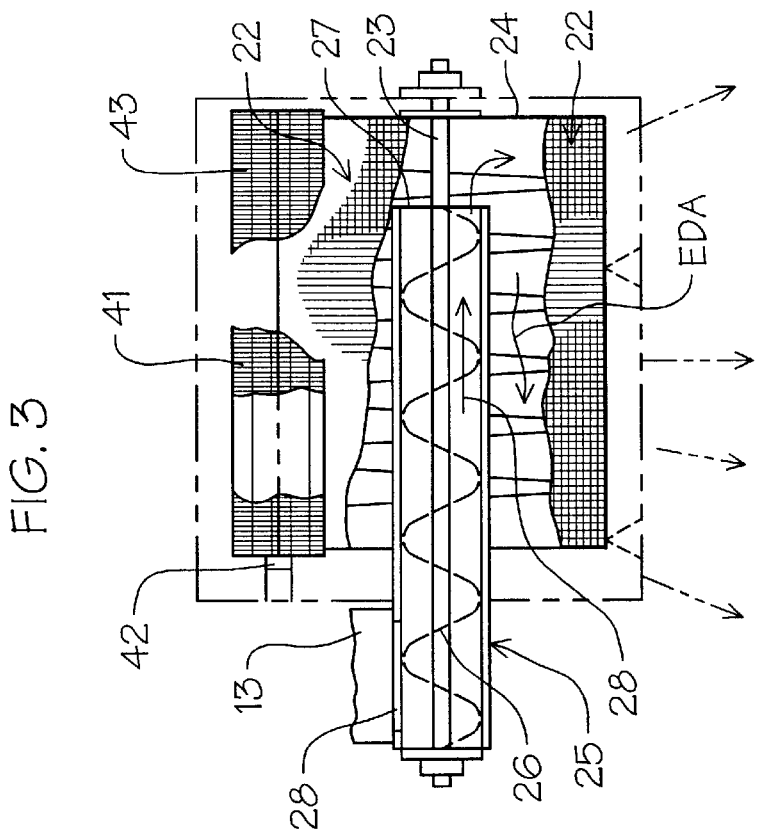
Figure 7:
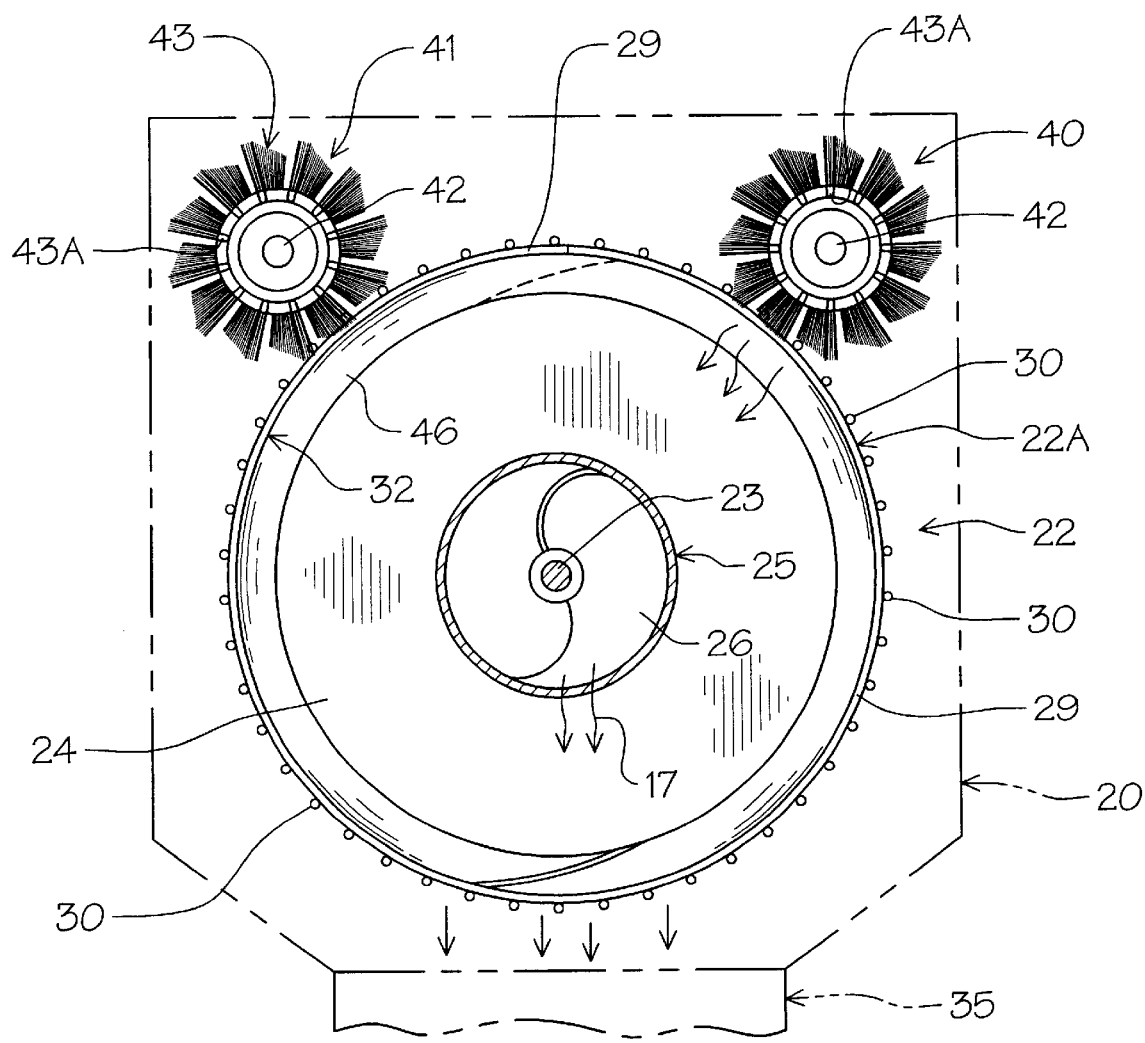

Referring now to FIGS. 2, 3 and 7 of the drawings, a pair of filter engagement brushes 40 and 41 can be seen positioned against the outer surface 22A of the filter drum 22. Each of the filter brushes 40 and 41 has a central support shaft 42 with multiple sets of bristle assemblies 43 positioned thereon. The filter brushes 40 and 41 are well known within the art and are commercially available manufactured by Material Control, Inc. of Aurora, Ill. as a conveyor belt cleaner under Model No. 99. The actual configuration of the bristle assemblies 43 is characterized by helical bristle mounting channels 43A illustrated graphically with reference only in FIG. 7 of the drawings. The brushes 40 and 41 significantly engage the outer surface 22A of the drum 22 so as to be driven thereby as the filter drum 22 is rotated by the attached drive shaft 23.

During use, given the positioning of the brushes 40 and 41 which are opposite that of the material outlet areas of the drum generally indicated at 44. The brushes, accordingly, will effectively clean the filter rods 29 of any retaining material as the drum rotates as indicated by the broken and solid arrows 45.

Referring now to FIGS. 3 and 7 of the drawings, an internal spiral material transfer screw flight 46 extends from the interior surface 32 of the drum 22 in a reverse spiral orientation to that of the screw flight 26 as hereinbefore described. The spiral transfer flight 46 directs the contaminated abrasive blast media 17 along the interior length of the drum 22 being filtered as it passes over the respective drum surface which initially filters out relatively finer, small particles indicated at 33 and then a larger size over the balance interior surface of the drum at 34, finally ejecting large waste material unable to pass through the drum at an open end 47 indicated by directional arrows EDA in FIG. 3 of the drawings.

Referring now to FIGS. 1, 2 and 3 of the drawings, an apertured flow path and associated action can be described as follows. The contaminated abrasive blast material 17 is dumped into the inlet hopper 16 of the elevator 13 which as described lifts and deposits the blast media 17 into the inlet 28 of the feed cylinder 25. The screw flight 26 then progressively moves the material there along out the open end of the cylinder 25 depositing it adjacent the drum's closed end 24 onto the "fine" filter portion 33 of the interior drum surface as hereinbefore described.

As noted, the contaminated abrasive blasting material is progressively moved along the inside of the filter drum 22 with the finest contaminant materials being drawn off through a fine portion and dust outlet 48 in communication with the vacuum dust control system indicated at 39. The recyclable abrasive blast material 49 along with reduced contaminants is filtered through the coarse filter surface 34 of the interior of the drum 22 and passes directly into the air washer 35 for further separation as described previously. Finally, as noted, large contaminant material LCM is moved out the reverse open end 47 of the drum 22 as indicated by the waste ejection arrows. The now separated and reusable abrasive blast media 17 is collected and dispensed through a collection outlet 50 of the air washer 35.

It will be evident to those skilled in the art that the entire separator and recovery device 10 of the invention is portable in that it can be transported by its integral base 11 by appropriate machine lift means such as a forklift (not shown) and connected to a source of power and ancillary equipment as needed and described hereinbefore.

While it will be apparent to those skilled in the art that some of the various individual components of the mobile separation system for contaminated abrasive blast material separation are each known and understood within the art, it is the new adaption and a new modification of the principle filter drum 22 in this environment in combination with the hereinbefore described associated elements that is the subject of the invention.

Only the separation and recovery device 10 of the invention as thus described allows for improved and enhanced drum filter action increasing the efficiency and capacity of a small affordable point of use abrasive blast separation systems used within the industry.

It will also be noted that in some applications a secondary magnet separation drum 51 shown in broken lines in FIG. 1 of the drawings can be added. Such magnet drums 51 are well known within the art and it would in this application provide a separation of ferrous and non-ferrous material in the processing of the recyclable abrasive blast material 49 and reduce contaminants entering the primary filter drum 22 of the subject invention.

It will thus be seen that a new and novel point of use mobile abrasive blasting media separation device has been illustrated and described and it will be apparent to those skilled in the art that various changes and modification may be made therein without departing from the spirit of the invention.

Therefore I claim:

1. An apparatus for cleaning, separating and recovery of contaminated abrasive blasting media for reuse comprises, an integral separation apparatus in a transportable frame, said separation apparatus comprises a separation drum having a plurality of spaced parallel rods rotatable about its longitudinal axis, said rods being cross-sectionally triangular and interconnected together about their exterior surface, an in feed cylinder within said drum in annular spaced relation to said rods, a target interior surface in said drum for receiving said contaminated abrasive blasting media from said feed cylinder, groups of continuous circumferential openings between said rods of different transverse dimensions, said circumferential rods defining an interior filtering surface, an air washer in communication with said drum to receive the abrasive blasting media there from, means for transporting said contaminated abrasive blast media through said in feed cylinder and said drum, means for cleaning said drum, means for selective waste output from said drum and means for rotating said drum and said contaminated abrasive blast material transportation means.

2. The apparatus for abrasive separation set forth in claim 1 wherein said feed cylinder has a material inlet opening and a material outlet opening.

3. The apparatus for abrasive blast separation set forth in claim 1 wherein said groups of continuous circumferential openings between said rods are of a known dimension and said remaining group is of a dimension greater than that of said known dimension.

4. The abrasive blast separation unit set forth in claim 1 wherein said rods are interconnected by a plurality of radially spaced support bars extending transversely across said rods.

5. The apparatus for abrasive blast separation set forth in claim 1 wherein said means for transporting said contaminated abrasive blast material through said feed cylinder comprises a screw flight on a central support and drive shaft.

6. The apparatus for abrasive blast separation set forth in claim 1 wherein said means for selective waste output from said filter drum comprises a spiral flight on the filtering interior surface and multiple waste outlets.

7. The apparatus for abrasive blast separation set forth in claim 1 wherein said means for transporting said contaminated abrasive blast media through said drum comprises, a spiral material waste transport flight extending from said drum's inner surface.

8. The apparatus for abrasive blast separation set forth in claim 1 wherein said rods are cross-sectionally triangular having a base portion.

9. The apparatus for abrasive blast separation set forth in claim 8 wherein said rod's base portion define the interior surface of said drum.

10. The apparatus for abrasive blast separation set forth in claim 1 wherein said means for cleaning said drum comprises a brush element rotatably engaged against the outer surface of the drum.

11. The apparatus for abrasive blast separation set forth in claim 5 wherein means for rotating said drum comprises the feed cylinder drive shaft.

12. The apparatus for abrasive blast separation set forth in claim 1 wherein said target interior of said drum extends inwardly from a closed end of said drum.

13. The apparatus for abrasive blast separation set forth in claim 12 wherein said target interior is of a group of circumferentially spaced openings of a known size.

14. The apparatus for abrasive blast separation set forth in claim 12 wherein said remaining drum interior is of a group of circumferentially spaced openings of a size greater then that of said spaced openings known size.

* * * * *